United States Patent
Popall et al.

(10) Patent No.: US 9,434,818 B2
(45) Date of Patent: Sep. 6, 2016

(54) POLYMERIZABLE COMPOSITIONS, CURED PRODUCTS OBTAINED THEREWITH, AND USE OF THESE MATERIALS

(75) Inventors: Michael Popall, Würzburg (DE); Ruth Houbertz-Krauss, Würzburg (DE); Sebastien Cochet, Würzburg (DE); Herbert Wolter, Tauberbischofsheim (DE); Kentaro Ohmori, Funabashi (JP); Tetsuo Sato, Funabashi (JP)

(73) Assignees: Fraunhofer-Gesellschaft zur Foerderung der angewandter Forschung e.V., Munich (DE); Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 13/980,501

(22) PCT Filed: Jan. 21, 2011

(86) PCT No.: PCT/EP2011/000254
§ 371 (c)(1),
(2), (4) Date: Nov. 1, 2013

(87) PCT Pub. No.: WO2012/097836
PCT Pub. Date: Jul. 26, 2012

(65) Prior Publication Data
US 2014/0051821 A1    Feb. 20, 2014

(51) Int. Cl.
| C08L 83/04 | (2006.01) |
| C08G 77/20 | (2006.01) |
| C08L 43/04 | (2006.01) |
| C08F 2/24  | (2006.01) |
| C08F 230/08 | (2006.01) |
| C09D 183/04 | (2006.01) |
| C08G 77/00 | (2006.01) |

(52) U.S. Cl.
CPC .............. *C08G 77/20* (2013.01); *C08L 83/04* (2013.01); *C08F 2/24* (2013.01); *C08F 230/08* (2013.01); *C08G 77/80* (2013.01); *C08L 43/04* (2013.01); *C09D 183/04* (2013.01)

(58) Field of Classification Search
CPC ..... C08L 43/04; C08L 83/04; C09D 184/04; C08F 2/24; C08F 230/08
See application file for complete search history.

(56) References Cited

U.S. PATENT DOCUMENTS

| 6,727,337 B2 | 4/2004 | Friedrich |
| 6,800,724 B2 | 10/2004 | Zha et al. |
| 6,803,476 B2 | 10/2004 | Rantala et al. |
| 6,965,006 B2 | 11/2005 | Zha |
| 6,984,483 B1 | 1/2006 | Roscher et al. |
| 7,062,145 B2 | 6/2006 | Rantala et al. |
| 7,280,731 B2 | 10/2007 | Rantala |
| 7,696,295 B2 | 4/2010 | Kondo et al. |
| 7,729,587 B2 | 6/2010 | Bae et al. |
| 7,813,615 B2 | 10/2010 | Bae et al. |
| 7,833,820 B2 | 11/2010 | Rantala |
| 7,901,863 B2 * | 3/2011 | Yamada et al. ............ 430/270.1 |
| 2003/0216537 A1 | 11/2003 | Friedrich |
| 2003/0232951 A1 | 12/2003 | Friedrich |
| 2004/0005131 A1 | 1/2004 | Rantala et al. |
| 2004/0242830 A1 | 12/2004 | Frohlich et al. |
| 2005/0244658 A1 | 11/2005 | Bae et al. |
| 2009/0012255 A1 | 1/2009 | Bae et al. |

(Continued)

FOREIGN PATENT DOCUMENTS

| DE | 10148894 | 4/2003 |
| EP | 1196478 | 4/2002 |

(Continued)

*Primary Examiner* — Margaret Moore
(74) *Attorney, Agent, or Firm* — Duane Morris LLP (57) ABSTRACT

[Problem] To provide a polymerizable composition having an excellent transparency in near-infrared wavelength and excellent heat resistance, and a method for producing the same. [Means of Solving the Problem] A polymerizable composition includes: a reactive silicone compound obtained by polycondensing a diaryl silicic acid compound of Formula [1] below with a silane compound, selected under compounds of Formula [2] and Formula [2b] below in the presence of an acid or a base; and (b) a compound having at least one polymerizable group selected from the group consisting of alkenyl group and (meth)acryl group, wherein $Ar^1$ and $Ar^2$ are independently a phenyl group optionally substituted with a $C_1$-$C_6$ alkyl group, and X is a group which can undergo a hydrolytic condensation reaction, and wherein $Ar^3$ is naphthyl or anthracyl substituted with at least one group having a polymerizable double bond, or wherein $Ar^3$ is phenyl substituted with at least one group having a polymerizable double bond other than vinyl, or is phenyl substituted with at least two groups having a polymerizable double bond.

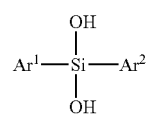

[1]

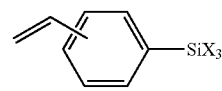

[2]

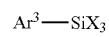

[2b]

14 Claims, 1 Drawing Sheet

(56) References Cited

U.S. PATENT DOCUMENTS

| | | | |
|---|---|---|---|
| 2009/0283937 A1* | 11/2009 | Kodama et al. | 264/447 |
| 2010/0019399 A1 | 1/2010 | Kimura et al. | |
| 2010/0104827 A1* | 4/2010 | Yorisue | 428/195.1 |
| 2010/0123259 A1 | 5/2010 | Yorisue | |
| 2010/0233616 A1 | 9/2010 | Kobayashi et al. | |

FOREIGN PATENT DOCUMENTS

| | | |
|---|---|---|
| EP | 1593703 | 11/2005 |
| EP | 1544257 | 8/2007 |
| EP | 2067800 | 6/2009 |
| EP | 2157624 | 2/2010 |
| EP | 2223957 | 9/2010 |
| EP | 1787163 | 11/2010 |
| EP | 1979398 | 4/2011 |
| JP | 11-61081 | 5/1999 |
| JP | 2004170684 A | 6/2004 |
| JP | 2008297490 | 12/2008 |
| JP | 2010031272 | 2/2010 |
| JP | 2010047746 | 3/2010 |
| JP | 2010/132576 | 6/2010 |
| WO | WO 03/097719 | 11/2003 |
| WO | WO 2008/041630 | 4/2008 |
| WO | WO 2008/123210 | 10/2008 |

* cited by examiner

POLYMERIZABLE COMPOSITIONS, CURED PRODUCTS OBTAINED THEREWITH, AND USE OF THESE MATERIALS

TECHNICAL FIELD

The present invention relates to a polymerizable composition excellent in transparency and heat resistance, which is useful for optical applications, e.g. as an optical adhesive or a transparent sealer. Specifically this composition is useful for the preparation of on-board optical interconnections, for example as a core material, or, when filled with suitable particles, e.g. inorganic fine particles, as a core or cladding material in optical transmission devices.

Such polymerizable compositions are often called "resins". The present invention also relates to cured products prepared from the compositions or resins, and suitable uses of the compositions and of the cured products.

BACKGROUND ART

In recent years, there are increasing demands for higher speed and greater capacity with respect to communications and signal transmission. The significance of optical signal transmission in wiring within a device in place of electrical signal transmission has also increased. Such optical communication technology over a short distance is called an optical interconnect, and its component, a photoelectrical composite substrate in which a part of copper electrical wiring on a printed wiring substrate is replaced with an optical fiber or an optical wiring as an optical waveguide, has been actively developed.

A light receiving-emitting element for transmitting and receiving light through the optical waveguide on the photoelectrical composite substrate, is sealed with a transparent optical adhesive in order to increase the reliability of the element. For example, the optical adhesive is used to connect the optical waveguide on the substrate to a light receiving-emitting element such as a surface-emitting laser element (VCSEL), and reflow soldering is subsequently carried out to connect the electrical wiring to the light receiving-emitting element and also to fix the element.

Such an optical adhesive must be transparent in the near-infrared wavelengths of 850 nm, 1.31 µm, and 1.55 µm, which are used for optical communications. Furthermore, in order to reduce light loss caused by refractive index differences between the optical waveguide or the light receiving-emitting element and the optical adhesive, the refractive index of the optical adhesive is desirably adjustable.

Moreover, the use of high-strength lead-free soldering is being studied in order to strongly fix the light receiving-emitting element on the photoelectrical composite substrate, however, lead-free soldering requires a high temperature for reflowing. For this reason, a high temperature of 280° C. is applied to the printed wiring substrate, and there is thus strong demand for an optical adhesive with high heat resistance.

An optical adhesive that is excellent in transparency and heat resistance is known from prior art. For example, a curable resin composition characterized by containing an adamantane derivative in a specific structure (see Patent Document 1), and a curable resin composition characterized by containing (meth)acrylic acid ester having an alicyclic hydrocarbon group (see Patent Document 2) have been developed.

Furthermore, some of the inventors of the present invention have heretofore developed a reactive product produced by subjecting functional organic alkoxysilane to polycondensation without actively adding water, and also proposed an application of the product to an optical component. Especially, they have reacted a diphenylsilanediol with a trialkoxysilane wherein an organic residue bound to the silane atome comprised at least one epoxy group or C=C double bond, by which they obtained a polyorganosiloxane product useful for optical applications. This product is well known to be excellent in transparency and heat resistance (see Patent Document 3). It belongs to the group of materials called ORMOCER (registered trademark).

Recently, a polyorganosiloxane composition has been disclosed, comprising (a) a polyorganosiloxane obtained by mixing and polymerizing a diphenylsilanediol or a comparable silanediol carrying two aromatic groups bound to the silane molecule via a carbon atom, a trialkoxysilane carrying a organically polymerizable group, selected under groups containing an epoxy group and a carbon-carbon double bond, and a catalyst without purposely adding water, (b) a photopolymerization initiator, and (c) an organic compound having two ore more photopolymerizable unsaturated bond groups which are selected under (meth)acrylates (see Patent Document 4).

[Patent Document 1] Japanese Patent Application Publication No. JP-A-2010-132576
[Patent Document 2] Japanese Patent Application Publication No. JP-A-11-61081
[Patent Document 3] U.S. Pat. No. 6,984,483 B1
[Patent Document 4] EP 2 067 800 A1

DISCLOSURE OF THE INVENTION

Problem to be Solved by the Invention

While practical use of the photoelectrical composite substrate is currently under study, the optical adhesive requires even higher heat resistance from the standpoint of reliability.

Generally, introducing a rigid structure within a molecule is said to be effective for increasing the heat resistance of a polymerizable compound. However, a problem arises in that such a polymerizable compound is difficult to handle because of excessively high viscosity and a cured product thereof is hard and fragile.

Furthermore, in order to control the viscosity, dilution with a low viscosity solvent, a low viscosity reactive compound, and the like has been studied; however, these diluents volatilize at low temperatures, so a problem remains because the original goal of higher heat resistance is impaired.

The present invention was devised in light of the foregoing circumstances, and it is an object of the present invention to provide a method for producing a polymerizable composition that is transparent in an optical range of near-infrared wavelength used for optical communications, capable of adjusting a refractive index thereof, excellent in workability due to adjustment to suitable viscosity, and further excellent in heat resistance after curing.

Means for Solving the Problem

The inventors of the present invention have diligently studied to achieve the above-mentioned object, have found that a polymerizable composition comprising a reactive silicone compound having a specific structure and a reactive diluent having a specific structure, is excellent in transparency and heat resistance, and capable of adjusting to a viscosity that leads to an excellent workability, and they have completed the present invention.

That is, the present invention provides a polymerizable composition comprising:

(a) a reactive silicone compound obtained by polycondensing a diaryl silicic acid compound of Formula [1] below with a silane compound of Formula [2] or Formula [2b] below in the presence of an acid or a base; and (b) a compound having at least one polymerizable group selected from the group consisting of an alkenyl group and (meth)acryl group,

[1]

[2]

[2b]

wherein $Ar^1$ and $Ar^2$ are independently a phenyl group optionally substituted with a $C_1$-$C_6$ alkyl group, X is a group which can undergo a hydrolytic condensation reaction, preferably an alkoxy group, an acyloxy group, an alkylcarbonyl group, an alkoxycarbonyl group, or a group $NR^4_2$, wherein $R^4$ is hydrogen, alkyl group, or aryl group, the aryl group being optionally substituted with an aliphatic hydrocarbon group, and wherein $Ar^3$ is naphthyl or anthracyl substituted with at least one group having a polymerizable double bond, or wherein $Ar^3$ is phenyl substituted with at least one group having a polymerizable double bond other than vinyl, or is phenyl substituted with at least two groups having a polymerizable double bond.

In preferred embodiments, X in formulae [2] or [2b] is an alkoxy group having 1-10 carbon atoms, an acyloxy group having 2-5 carbon atoms, an alkylcarbonyl group having 2-6 carbon atoms, an alkoxycarbonyl group having 2-6 carbon atoms or a group $NR^4_2$, wherein $R^4$ is hydrogen or alkyl having 1-6 carbon atoms. More preferred, X is an alkoxy group having 1 to 6 carbon atoms, and most preferred, X is methoxy or ethoxy.

$Ar^3$ is preferably a phenyl group substituted with an allyl group, or a phenyl group substituted with two vinyl groups.

In a first embodiment of the composition of the present invention, it is preferred that the compound having at least one polymerizable group is a compound of Formula [3]

[3]

wherein $R^1$ is a hydrogen atom or methyl group, L is a single bond, a hydrogen atom, an oxygen atom, a $C_{1-20}$ aliphatic hydrocarbon residue having m-valence that is optionally substituted with a phenyl group, a $C_{1-20}$ aliphatic hydrocarbon residue having m-valence that optionally contains an ether bond, or a $C_{1-20}$ polyvalent alcohol residue optionally containing an ether bond, $Ar^4$ is an aromatic, monocyclic or bicyclic or tricyclic hydrocarbon residue with n+1 valences, m is an integer of 1 to 3 (with the proviso that in a case where L is a hydrogen atom, m is 1, and in a case where L is a single bond or an oxygen atom, m is 2), and each of n is independently 1 or 2.

Examples of $Ar^4$ are phenyl, naphthyl or anthracyl residues, which can be further substituted, preferably with $C_1$-$C_6$ alkyl, or are unsubstituted. It is more preferred that $Ar^4$ is a phenyl residue. Independently thereof, it is preferred that $R^1$ is hydrogen. In another, independently preferred embodiment, n in the formula [3] is 2. It is even more preferred that $Ar^4$ is a phenyl residue and $R^1$ is hydrogen. It is still more preferred that $Ar^4$ is a phenyl residue, $R^1$ is hydrogen, and n is 2. It is most preferred that in all of the foregoing embodiments of formula [3], L is a hydrogen atom, and m is 1.

In another embodiment of the composition of the present invention, it is preferred that the compound having at least one polymerizable group is a compound of Formula [4]

[4]

wherein $R^2$ is a hydrogen atom or methyl group, $R^3$ is a $C_{1-20}$ aliphatic hydrocarbon residue having p-valence that is optionally substituted with a phenyl group, a $C_{1-20}$ aliphatic hydrocarbon residue having p-valence that optionally contains an ether bond, or a $C_{1-20}$ polyvalent alcohol residue optionally containing an ether bond, and p is an integer of 1 to 6.

It is more preferable that in the Formula [4], $R^3$ is a $C_{2-10}$ polyvalent alcohol residue optionally containing an ether bond, and p is an integer of 2 to 6.

It is also preferable that the composition of the present invention further comprises inorganic fine particles.

It is preferable that the composition of the present invention further comprises a solvent in addition to the inorganic fine particles.

In addition, it is preferable that the composition of the present invention further comprises a polymerization initiator.

Further, the present invention provides also a cured product obtained by reacting a polymerizable double bond in the reactive silicone compound with the polymerizable group in the compound having at least one polymerizable group, in the above-mentioned composition, the cured product being with or without fine particles. The cured product is suitable for optical applications, e.g. optical adhesives or a transparent sealers. It is specifically preferred that this cured material is used for optical interconnections, e.g. optical interconnections for printed wiring boards, such as chip-to-chip interconnections.

Effects of the Invention

According to the present invention providing a polymerizable composition comprising a combination of a reactive silicone compound having a specific structure with, as a reactive diluent, a compound having at least one polymerizable group selected from the group consisting of an alkenyl group and (meth)acryl group, in an adjusted content, it is possible to avoid significantly deteriorating heat resistance compared to that of before dilution, or to improve the heat resistance up to 280° C. or even higher, e.g. 300° C. or more, and at the same time, to adjust a viscosity to a value at which good workability is attained.

Furthermore, in the polymerizable composition according to the present invention, it is also possible to control physical properties of a cured product that is obtained from the composition by dispersing inorganic fine particles therein. That is, by controlling types and amounts of the inorganic fine particles to be added, physical properties, such as a refractive index, a hardness of the cured product, or a cure shrinkage rate, can be adjusted to any value.

It is desirable that in case inorganic fine particles shall be incorporated into the polymerizable composition, they are used in a ratio of 1 to 70 parts by mass, preferably 5 to 60 parts by mass, relative to 100 parts by mass of the polymerizable composition including the inorganic fine particles. The term "mass of inorganic particles" is meant to include the mass of an organic silicon compound or an organic metal compound in case the inorganic fine particles have been treated with such a compound. In case that inorganic fine particle is below 5 parts by mass of the polymerizable composition and inorganic fine particle, it may well be that the desired effect of decreasing the value of coefficient of linear thermal expansion (CTE) and cure shrinkage is missing. Moreover, in case that inorganic fine particle is over 70 parts by mass of the polymerizable composition and the inorganic fine particles, the viscosity of the polymerizable composition including the inorganic fine particles remarkably increase, and it is difficult to handle it. However, it is possible to incorporate the inorganic fine particles in an amount outside the above mentioned range, if the mentioned effects are of minor importance for a specific purpose.

In addition, the polymerizable composition according to the present invention can be used as such for several materials as it has fully low viscosity even in a solvent-free form. Thus, in addition to improvement in workability, the composition can be applied for several processes such as embedding, bulking, forming or combining. The composition can be also used in a form of varnish by adding a solvent, and form a thin film.

Moreover, the cured product produced by polymerizing the polymerizable composition according to the present invention has excellent heat resistance that can endure high temperature reflowing required for lead-free soldering. If it has been prepared with a compound of Formula [3] as the reactive diluent, it is excellent in transparency in an optical range of near-infrared wavelength used for optical communications. As a result, it is effective for improving the reliability of an optical device that is used in the photoelectrical composite substrate and the like.

BEST MODE FOR CARRYING OUT THE INVENTION

The present invention will be described below in detail.

The present invention relates to a polymerizable composition, specifically the polymerizable composition characterized by comprising (a) a reactive silicone compound obtained by polycondensing a diaryl silicic acid compound having a specific structure with a silane compound having a specific structure in the presence of an acid or a base and (b) a compound having at least one polymerizable group selected from the group consisting of an alkenyl group and (meth)acryl group.

<(a) Reactive Silicone Compound>
<Diaryl Silicic Acid Compound>

The diaryl silicic acid compound includes a compound of Formula [1]:

where $Ar^1$ and $Ar^2$ are independently a phenyl group optionally substituted with a $C_1$-$C_6$ alkyl group. Examples of $Ar^1$ and $Ar^2$ include phenyl, 2-methylphenyl, 3-methylphenyl, 4-ethylphenyl, 4-isopropylphenyl and the like.

Specific examples of Formula [1] include diphenylsilanediol, di(4-methylphenyl)silanediol, di(4-ethylphenyl)silanediol, di(4-isopropylphenyl)silanediol, and the like, but it is not limited thereto.

It is possible that one or a mixture of two or even more diaryl silicic acid compound(s) of Formula [1] is/are used in the present invention.

<Silane Compound>

The silane compound includes a compound of Formula [2] or Formula [2b]:

wherein X is an alkoxy group having preferably 1-10 carbon atoms, an acyloxy group having preferably 2-5 carbon atoms, an alkylcarbonyl group having preferably 2-6 carbon atoms, an alkoxycarbonyl group having preferably 2-6 carbon atoms or a group $NR^4_2$, wherein $R^4$ is hydrogen or alkyl group preferably having 1-6 carbon atoms. Examples of the compound of formula [2] are 2-vinylphenyl silanes, 3-vinylphenyl silanes, and 4-vinylphenyl silanes. More preferred, X is an alkoxy group having 1 to 6 carbon atoms, and most preferred, X is methoxy or ethoxy, or $$Ar^3—SiX_3 \quad [2b]$$

wherein $Ar^3$ is naphthyl or anthracyl substituted with at least one group having a polymerizable double bond, or wherein $Ar^3$ is phenyl substituted with at least one group having a polymerizable double bond other than vinyl, or is phenyl substituted with at least two groups having a polymerizable double bond, and X is defined as mentioned above. Examples of $Ar^3$ include 4-vinyloxyphenyl, 4-allylphenyl, 4-allyloxyphenyl, 4-isopropenylphenyl, and the like.

Silane compounds of Formula [2] are preferred over silane compound of Formula [2b]. Moreover, it is most preferred that X is methoxy or ethoxy.

Specific examples of Formula [2] include 4-vinylphenyltrimethoxysilane, 4-vinylphenyltriethoxysilane, and the like, but it is not limited thereto.

It is possible to use one compound of Formula [2] or one compound of Formula [2b] for the present invention, but it is likewise possible to use two or even more compounds of Formula [2] or of Formula [2b] or a mixture of compounds of Formula [2]and Formula [2b].

<Combining Ratio of Diaryl Silicic Acid Compound and Silane Compound [2] or [2b]>

The diaryl silicic acid compound [1] and the compound of Formula [2] or Formula [2b] that are used for the polymerizable composition mentioned above are preferably combined in a range of a molar ratio of 2:1 to 1:2, in order to prevent block-copolymerization. These compounds are combined more preferably in a range of a molar ratio of 1.1:0.9 to 0.9:1.1. In specific embodiments, the molar ratio can approximately or exactly be 1:1. It is most preferred to use a molar ratio of between approximately 1:1 and 0.9:1.1, in order to ensure that no free hydroxy groups remain in the polymerizable composition.

The diaryl silicic acid compound and the silane compound can be optionally selected for use, as necessary, or a plurality of compounds [1] and/or compounds [2] or [2b] can be used in combination. Further, it is possible to use a mixture of compounds [2] and [2b], if desired. The molar ratio in such a case, is a ratio of a total molar amount of the diaryl silicic acid compound to a total molar amount of the compound [2] and/or [2b], which is also to be in the above-mentioned range.

<Condensation Reaction>

The structure of compound of formula [2] or [2b] is one of the characteristics of the present invention. The reactive group (polymerizable double bond) contained in this compound used in the present invention is easily polymerized by a radical to show a high heat resistance after polymerization (curing).

In general, when silane compounds of Formula [2] or [2b] are subjected to a polycondensation reaction with a diaryl silicic acid compound to obtain a silicone compound having a high heat resistance, it is required to cease the reaction in a suitable polymerization degree so as to keep a product liquid state. If the silane compound of Formula [2] or [2b] used in the present invention is an alkoxysilane compound, the polycondensation reaction with the diaryl silicic acid compound is mild, and thus it is easy to control the polymerization degree, and this is an advantage of this preferred embodiment of the present invention.

The polycondensation reaction between the compound of Formula [2] or [2b], preferably the alkoxysilane compound, and the diaryl silicic acid compound by dealcoholization or the like may be carried out without using a solvent, but a solvent inert for the compound of Formula [2] or [2b], such as toluene or the like may be used as a reaction solvent. In a case where no solvent is used and where the compound of Formula or [2b] is an alkoxysilane, there is an advantage that it becomes easy to distill off alcohols that are by-products in the reaction. On the other hand, in a case where a reaction solvent is used, there is an advantage that it is easy to make the reaction system homogeneous to provide a more stable polycondensation reaction.

<Solvent Used in Condensation Reaction>

The reaction of synthesizing the reactive silicone compound may be carried out without using a solvent as mentioned above, but a solvent may be used for more homogeneous reaction. The solvent is not particularly limited, as long as it does not react with the diaryl silicic acid compound and the alkoxysilane compound and dissolves a condensation product thereof.

Examples of the solvent include ketones such as acetone, methyl ethyl ketone, and the like, aromatic hydrocarbons such as benzene, toluene, xylene, and the like, glycols such as ethylene glycol, propylene glycol, hexylene glycol, and the like, glycol ethers such as ethyl cellosolve, butyl cellosolve, ethyl carbitol, butyl carbitol, diethyl cellosolve, diethyl carbitol, and the like, N-methylpyrrolidone, N,N-dimethylformamide, and the like, esters such as ethyl acetate and the like, and in specific cases, alcohols like methanol or ethanol. Alcohols are specifically preferred in case X in formula [2] or [2b] is not alkoxy because in these cases, the alcohol may be used for controlling the condensation reaction by re-esterification.

Specifically preferred are toluene, xylene and methyl ethyl ketone.

The solvents mentioned above may be used alone or in combination of two or more thereof.

<Others Such as Catalyst>

The type of catalyst to be used in a condensation reaction is not particularly limited and can be selected as necessary, as long as it is soluble in the above-mentioned solvent and disperses uniformly. In that case, a single type of catalyst may be used or a plurality of types thereof may be used in combination.

Examples of the catalyst usable include $Ti(OR)_4$, $Zr(OR)_4$, $B(OR)_3$, and $Al(OR)_3$ as acidic compounds, alkaline earth metal hydroxides as basic compounds, and $NH_4F$ and $NR_4F$ (where R is one or more groups selected from the group consisting of a linear $C_{1-12}$ hydrocarbon group, a branched $C_{3-12}$ alkyl group, and a cyclic $C_{3-12}$ alkyl group) as fluoride salts.

Specific examples of the acidic compounds include trimethoxyaluminum, triethoxyaluminum, tri-n-propoxyaluminum, triisopropoxyaluminum, tri-n-butoxyaluminum, tri-isobutoxyaluminum, tri-sec-butoxyaluminum, tri-tert-butoxyaluminum, trimethoxyboron, triethoxyboron, tri-n-propoxy boron, triisopropoxyboron, tri-n-butoxyboron, triisobutoxyboron, tri-sec-butoxyboron, tetramethoxytitanium, tetraethoxytitanium, tetra-n-propoxytitanium, tetraisopropoxytitanium, tetra-n-butoxytitanium, tetraisobutoxytitanium, tetra-sec-butoxytitanium, tetra-tert-butoxytitanium, tetramethoxyzirconium, tetraethoxyzirconium, tetra-n-propoxyzirconium, tetraisopropoxyzirconium, tetra-n-butoxyzirconium, tetraisobutoxyzirconium, tetra-sec-butoxyzirconium, tetra-tert-butoxyzirconium, and the like.

Examples of the basic compounds include barium hydroxide, sodium hydroxide, potassium hydroxide, strontium hydroxide, calcium hydroxide, magnesium hydroxide, ammonium hydroxide, tetramethylammonium hydroxide, tetrabutylammonium hydroxide, triethylamine, and the like.

Examples of the fluoride salts include ammonium fluoride, tetramethylammonium fluoride, tetrabutylammonium fluoride, and the like.

Among these catalysts, preferably used is one or more compounds selected from the group consisting of tetraisopropoxytitanium (titanium isopropoxide), barium hydroxide, strontium hydroxide, calcium hydroxide, and magnesium hydroxide.

The amount of the catalyst to be used is, relative to a total of the silicic acid compound and the alkoxysilane compound, 0.01 to 10% by mass, preferably 0.1 to 5% by mass. From the viewpoint of reaction proceeding, the amount of the catalyst to be used is 0.01% by mass or more.

<Reaction Condition of Condensation Reaction>

The reactive silicone compound used in the present invention is obtained by subjecting a diaryl silicic acid compound of Formula [1] and an alkoxysilane compound of Formula [2] to a condensation reaction, e.g. a dealcoholization condensation in the presence of an acid or a basic catalyst. Desirably, the polycondensation reaction is performed without adding water, and more preferred, the amount of water possibly incorporated through the environment (reagents, glass walls, atmosphere above the material) is held as low as possible and is most preferred completely absent. For this reason, the reaction is desirably carried out under inert gas atmosphere, such as nitrogen gas, and the reaction vessels are desirably heated before use. Further, water-free reagents are preferably used, so as to prevent water from mixing.

The reaction temperature can be selected as required and is preferably is in a range of 20 to 150° C., more preferably 30 to 120° C.

The reaction time is not particularly limited, as long as it is equivalent to or more than a time required until the increase of a molecular weight of the condensation product is stopped and a molecular weight distribution is stabilized, and more specifically, the time is from several hours to several days.

In case alkoxysilanes are used for the compounds of Formulae [2] and/or [2b], the reaction system accelerates the dealcoholization condensation. Therefore, alcohol may be distilled off during the reaction under reduced pressure, but this is not necessarily required.

<(b) Compound Having at Least One Polymerizable Group Selected from the Group Consisting of an Alkenyl Group and (Meth)Acryl Group>

Because the reactive silicone compound as mentioned above has high viscosity and provides poor workability, a reactive diluent needs to be added to reduce the viscosity. It is required that the reactive diluent does not significantly deteriorate heat resistance.

As the reactive diluent, a compound having at least one polymerizable group selected from the group consisting of an alkenyl group and (meth)acryl group is used in the present invention, preferably selected from compounds of Formula [3] below and compounds of Formula [4] below:

[3]

wherein $R^1$ is a hydrogen atom or methyl group, L is a single bond, a hydrogen atom, an oxygen atom, a $C_{1-20}$ aliphatic hydrocarbon residue having m-valence that is optionally substituted with a phenyl group, a $C_{1-20}$ aliphatic hydrocarbon residue having m-valence that optionally contains an ether bond, or a $C_{1-20}$ polyvalent alcohol residue optionally containing an ether bond, $Ar^4$ is an aromatic, monocyclic or bicyclic or tricyclic hydrocarbon residue with n+1 valences, m is an integer of 1 to 3 (with the proviso that in a case where L is a hydrogen atom, m is 1, and in a case where L is a single bond or an oxygen atom, m is 2), and each of n is independently 1 or 2.

Examples for group L are methyl group, ethyl group, propyl group, butyl group, hexyl group, benzyl group, phenethyl group, methylene group, ethylene group, propylene group, butylene group, hexylene group, methoxymethylene group, ethoxymethylene group, methoxyethylene group, ethylene glycol residue (—CH$_2$CH$_2$OCH$_2$CH$_2$—), diethylene glycol residue (—(CH$_2$CH$_2$O)$_2$CH$_2$—CH$_2$—), propylene glycol residue (—CH$_2$CH$_2$CH$_2$OCH$_2$CH$_2$CH$_2$—), 1,1,1-propanetriol residue (—C(-)$_2$CH$_2$CH$_3$), 1,1,3-propanetriol residue (—CH(-)CH$_2$CH$_2$—), 1,2,4-butanetriol residue (—CH$_2$CH(-)CH$_2$CH$_2$—), or the like.

Examples of $Ar^4$ are phenyl, naphthyl or anthracyl residues, which can be substituted, preferably with $C_1$-$C_6$ alkyl, or are unsubstituted. It is more preferred that $Ar^4$ is a phenyl residue. Independently thereof, it is preferred that $R^1$ is hydrogen. In another, independently preferred embodiment, n in the formula [3] is 2. It is even more preferred that $Ar^4$ is a phenyl residue and $R^1$ is hydrogen. It is still more preferred that $Ar^4$ is a phenyl residue, $R^1$ is hydrogen, and n is 2. It is most preferred that in all of the foregoing embodiments of formula [3], L is a hydrogen atom, and m is 1,

[4]

where $R^2$ is a hydrogen atom or a methyl group, $R^3$ is a p-valent $C_{1-20}$ aliphatic hydrocarbon residue optionally substituted with a phenyl group, or a p-valent $C_{1-20}$ aliphatic hydrocarbon residue optionally containing an ether bond, and p is an integer of 1 to 6.

Examples of $R^3$ in Formula [4] include methyl group, ethyl group, propyl group, butyl group, hexyl group, benzyl group, phenethyl group, methylene group, ethylene group, propylene group, butylene group, hexylene group, methoxymethylene group, ethoxymethylene group, methoxyethylene group, ethylene glycol residue (—CH$_2$CH$_2$OCH$_2$CH$_2$—), diethylene glycol residue (—(CH$_2$CH$_2$O)$_2$CH$_2$CH$_2$—), propylene glycol residue (—CH$_2$CH$_2$CH$_2$OCH$_2$CH$_2$CH$_2$—), 1,1,1-propanetriol residue (—C(-)$_2$CH$_2$CH$_3$), 1,3,3-propanetriol residue (—CH(-)CH$_2$CH$_2$—), 1,2,4-butanetriol residue (—CH$_2$CH(-)CH$_2$CH$_2$—), and the like.

It is more preferable that in the Formula [4], $R^3$ is a $C_{2-10}$ polyvalent alcohol residue optionally containing an ether bond, and p is an integer of 2 to 6.

According to the invention, one or more reactive diluent(s) of Formula [3] and/or can be used. However, it should be kept in mind that for preparing a cured product having the desired transparency in the near-infrared wavelengths of 850 nm, 1.31 µm, and 1.55 µm, it is preferred that one or more compound(s) of formula [3], but no compound of Formula [4] are used.

Hereinafter, specific examples of the compounds of Formulae [3] and [4] are mentioned, but it is not limited thereto.

Specific examples of the compounds of Formula [3] include divinylbenzene, styrene, diisopropenylbenzene, 4,4'-divinylbiphenyl, 2-(4-vinylphenoxy)styrene, 4-phenethyl styrene, 1,1,1-tris(4-vinylphenoxy)propane, and the like.

Specific examples of the compounds of Formula [4] include benzyl (meth)acrylate, neopentyl glycol di(meth)acrylate, 1,6-hexanediol di(meth)acrylate, 1,9-nonanediol di(meth)acrylate, trimethylolpropane tri(meth)acrylate, pentaerythritol tetra(meth)acrylate, dipentaerythritol hexa(meth)acrylate, ditrimethylolpropane tetra(meth)acrylate, ethylene glycol di(meth)acrylate, diethylene glycol di(mefh)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, ethoxylated bisphenol-A di(meth)acrylate, ethoxylated trimethylolpropane tri(meth)acrylate, propoxylated trimethylolpropane tri(meth)acrylate, ethoxylated pentaerythritol tetra(meth)acrylate, propoxylated pentaerythritol tetra(meth)acrylate, ethylene glycol diglycidyl ether (meth)acrylic acid adduct, propylene glycol diglycidyl ether (meth)acrylic acid adduct, and the like.

In the polymerizable composition of the present invention, it is desirable that the compound having at least one polymerizable group selected from the group consisting of an alkenyl group and (meth)acryl group as the reactive diluent is used in a ratio of 1 to 100 parts by mass, preferably 5 to 70 parts by mass based on 100 parts by mass of the reactive silicone compound.

Particularly, in a case where the compound of Formula [3] is used as the reactive diluent, it is desirable that it is used in a ratio of 1 to 100 parts by mass, preferably 5 to 70 parts by mass based on 100 parts by mass of the reactive silicone compound.

In addition, in a case where the compound of Formula [4] is used as the reactive diluent, it is desirable that it is used in a ratio of 1 to 100 parts by mass, preferably 5 to 50parts by mass based on 100 parts by mass of the reactive silicone compound.

However, it is to be noted that ratios other than those mentioned above are likewise possible.

<Inorganic Fine Particle>

Unless effects of the present invention are impaired, inorganic fine particles may be added, as necessary, to the polymerizable composition according to the present invention. The addition of the inorganic fine particles makes possible to control refractive index and hardness of the cured product as mentioned below, and to lower cure shrinkage.

In the present invention, oxides, sulfides and nitrides of one or more metals selected from the group consisting of Be, Al, Si, Ti, V, Fe, Cu, Zn, Y, Zr, Nb, Mo, In, Sn, Sb, Ta, W, Pb, Bi and Ce are suitable as the inorganic fine particles, and the metal oxides are particularly suitable. The inorganic fine particles may be used alone or in a combination of two or more thereof.

Specific examples of the inorganic fine particles include $Al_2O_3$, ZnO, $TiO_2$, $ZrO_2$, $Fe_2O_3$, $Sb_2O_5$, BeO, ZnO, $SnO_2$, $CeO_2$, $SiO_2$, $WO_3$, and the like.

In addition, it is also effective that plural metal oxides are used as a complex oxide. The complex oxide is prepared by mixing two or more inorganic oxides in the stage of the preparation of the fine particles. For example, the complex oxide includes a complex oxide of $TiO_2$ with $ZrO_2$, a complex oxide of $TiO_2$ with $ZrO_2$ and $SnO_2$, a complex oxide of $ZrO_2$ with $SnO_2$, and the like.

Further, the inorganic fine particles may be the compounds of the above-mentioned metals. For example, $ZnSb_2O_6$, $BaTiO_3$, $SrTiO_3$, $SrSnO_3$, and the like are mentioned. These compounds may be used alone or in a combination of two or more thereof, and further may be used in a mixture with the above-mentioned oxides.

The particle diameter of the inorganic fine particles is not particularly limited, but taking an improvement in dispersibility in a dispersed liquid into account, it is suitable that the primary particle diameter is 2 to 50 nm, preferably 5 to 15 nm. In the meantime, the primary particle diameter is a value measured by observation with transmission electron microscope.

In addition, when the inorganic fine particles are used, the fine particles may be used as such, or in a colloidal state (colloidal particles) in which the particles are previously dispersed in water or an organic solvent. The inorganic fine particles may be also used in a state dispersed in the reactive diluent.

The organic solvent used as dispersion of inorganic fine particle includes ketones, esters, ethers, hydrocarbons, halogenated carbons, carboxylic amide and the like. These organic solvents may be used alone or in a mixed solvent. Concretely, ketones include methyl ethyl ketone (MEK), diethyl ketone, methyl isobutyl ketone (MIBK), methyl amyl ketone, cyclohexanone etc. Esters include ethyl acetate, butyl acetate, propylene glycol methyl ether acetate, diethylene glycol monoethyl acetate, methyl acrylate, methyl methacrylate, etc. Ethers include dibutyl ether, dioxane, etc. Hydrocarbons include toluene, xylene, solvent naphtha, etc. Halogenated carbons include carbon tetrachloride, dichloroethane, chlorobenzene, etc. Carboxylic amides include DMF, dimethylacetamide, N-methyl-2-pyrrolidone, etc.

Further, the inorganic fine particles may be particles obtained by subjecting to treatment with a silicon oxide, an organic silicon compound, an organic metal compound, and the like.

The treatment with a silicon oxide comprises causing growth of silicon oxide fine particles on the surface of the inorganic fine particles dispersed in a medium by a known method. The treatment with an organic silicon compound or an organic metal compound comprises adding this compound into the inorganic fine particles dispersed in a medium, and heating with stirring.

The organic silicon compound includes a silane coupling agent or a silane. Specific examples of the silane coupling agent include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethylditriethoxysilane, 3-glycidoxypropyltriethoxysilane, p-vinylphenyltrimethoxysilane, 3-methacryloyloxypropylmethyldimethoxysilane, 3-methacryloyloxypropyltrimethoxysilane, 3-methacryloyloxypropylmethyldiethoxysilane, 3-methacryloyloxypropyltriethoxysilane, 3-acryloyloxypropyltrimethoxysilane, N-2-(aminoethyl)-3-aminopropylmethyldimethoxysilane, N-2-(aminoethyl)-3-aminopropylmethyltrimethoxysilane, N-2-(aminoethyl)-3aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, and the like.

In addition, specific examples of the silane include methyltrichlorosilane, dimethyldichlorosilane, trimethylchlorosilane, phenyltrichlorosilane, methyltrimethoxysilane, dimethyldimethoxysilane, phenyltrimethoxysilane, methyltriethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, decyltrimethoxysilane, trifluoropropyltrimethoxysilane, hexamethyldisilazane, and the like.

As the organic metal compound, titanate-type coupling agents and aluminum-type coupling agents are mentioned. Specific examples of the titanate-type coupling agents include Prenact KRTTS, KR 46B, KR 38B, KR 138S, KR238S, 338X, KR44, KR 9SA, KR ET5, KR ET (manufactured by Ajinomoto Fine-Techno Co., Inc.), and the like, and specific examples of the aluminum-type coupling agents include Prenact AL-M (manufactured by Ajinomoto Fine-Techno Co., Inc.), and the like.

The used amount of the organic silicon compound or organic metal compound is preferably 2 to 100 parts by mass based on 100 parts by mass of the inorganic fine particles.

The metal oxide colloidal particles can be produced by a known method such as ion exchange method, deflocculation method, hydrolysis method, reaction method, and the like.

The ion exchange method includes a method in which an acidic salt of the above-mentioned metal is treated with a hydrogen-type ion exchange resin, a method in which a basic salt of the above-mentioned metal is treated with a hydroxy group-type anion exchange resin, and the like.

The deflocculation method includes a method in which an acidic salt of the above-mentioned metal is neutralized with a base, a method in which an alkoxide of the above-mentioned metal is hydrolyzed, a method in which a basic salt of the above-mentioned metal is hydrolyzed under heating and then unnecessary acids are removed, and the like.

The reaction method includes a method in which a powder of the above-mentioned metal is reacted with an acid, and the like.

The inorganic fine particles are, from the viewpoint of dispersibility in the polymerizable composition of the present invention, preferably one with a surface modified by a hydrophobic group, such as a phenyl group. Furthermore, from the viewpoint of immobilization to a cured product of the present invention, the surface is also preferably modified by a radical reactive group such as a vinylphenyl group.

Those inorganic fine particles are not particularly limited unless effects of the present invention are impaired, but they can be produced, for example, by using a method described in European Patent No. 1544257. Alternatively, a preferred one may be selected from commercially available products.

<Other Components>

Unless effects of the present invention are impaired, other components such as a surfactant, a leveling agent, an antioxidant, a light stabilizer, and the like can be added to the polymerizable composition of the present invention, as needed.

<Varnish (Application Liquid)>

The polymerizable composition of the present invention may be formed in a varnish by adding an organic solvent.

The solvent added in this case may be an organic solvent that can dissolve or disperse each component contained in the polymerizable composition, for example includes aromatic hydrocarbons such as toluene, xylene and the like, amides such as N,N-dimethylformamide, N,N-dimethylacetamide, N-methyl-2-pyrrolidone, and the like, sulfoxides such as dimethylsulfoxide and the like, ethers such as tetrahydrofuran, propylene glycol monomethyl ether, propylene glycol monomethyl ether acetate and the like, ketones such as methyl ethyl ketone, methyl isobutyl ketone, cyclohyxanone and the like, esters such as ethyl acetate, propyl acetate, ethyl lactate, butyl lactate, γ-butyrolactone and the like, halides such as chloroform, 1,2-dichloroethane, orthodichlorobenzene and the like.

In general, the range of concentration of the varnish is not specifically limited and can e.g. be from 1 to 100%. The concentration of varnish is defined to be the proportion of the mass of solid content (which means total composition except for organic solvent) to the mass of the polymerizable composition including the organic solvent. The concentration of varnish can be selected according to the purpose like controlling of thickness, filling and coating properties.

<Cured Product and Material for Optical Interconnection>

The polymerizable composition of the present invention can provide a cured product by reacting a polymerizable double bond in the reactive silicone compound with the polymerizable group in the compound having at least one polymerizable group, in the presence of a photo-radical initiator or a thermal radical initiator by light irradiation or heating.

The obtained cure product (formed product) is useful as material for an optical device, particularly material for optical interconnection.

Examples of a photo-radical initiator include acetophenones, benzophenones, benzoyl benzoate of Michler, amiloxime esters, tetramethylthiuram monosulfide, thioxanthones, and the like.

Particularly preferable is a photocleavable type photo-radical initiator. The photocleavable type photo-radical initiator is described in *Saishin UV Koka Gijutsu* (the latest UV curing technology) (p. 159, Kazuhiro Takahaku, published by Technical Information Institute Co., Ltd., 1991).

Examples of the photo-radical initiator that is commercially available include product names: Irgacure 184, 369, 651, 500, 819, 907, 784, 2959, CGI1700, CGI1750, CGI1850, and CG24-61, Darocure 1116, 1173, Lucirin TPO, manufactured by BASF; a product name: Uvecryl P36, manufactured by UCB; and product names: Esacure KIP 150, KIP65LT, KIP100F, KT37, KT55, KTO 46, KIP 75/B, manufactured by Fratelli Lamberti, and the like.

Examples of the thermal radical initiator include the following initiators.

1) Hydrogen peroxides such as t-butyl (3,5,5-trimethylhexanoyl) peroxide, t-butyl hydroperoxide, cumene hydroperoxide, peroxyacetic acid t-butyl, peroxybenzoic acid t-butyl, peroxyoctanoic acid t-butyl, peroxyneodecanoic acid t-butyl, peroxyisobutyric acid t-butyl, lauroyl peroxide, peroxypivalic acid t-amyl, peroxypivalic acid t-butyl, dicumyl peroxide, benzoyl peroxide, potassium persulfate, ammonium persulfate, and the like;

2) Azo compounds such as dimethyl 2,2'-azobis(2-methylpropionate), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethyleneisobutylamidine)dichloride, 2,2'-azobis(2-amidinopropane)dichloride, 2,2'-azobis(N,N-dimethyleneisobutylamide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutylamide)dihydrate, and the like.

3) Redox types of the following combinations:
A mixture of hydrogen peroxide or alkyl peroxide, peresters, percarbonates, and the like, with any of iron salts or titanous salts, zinc formaldehyde sulphoxylate or sodium formaldehyde sulphoxylate, and reducing sugars;
A combination of alkali metal or ammonium persulphates, perborates, or perchlorates with alkali metal bisulphites such as sodium metabisulphite, and reducing sugars;
A combination of alkali metal persulphates with arylphosphonic acids such as benzene phosphonic acid, other acids similar thereto, and reducing sugars.

The amount of the photo-radical initiator or the thermal radical initiator to be used is, based on 100 parts by mass of the polymerizable composition of the present invention, preferably in a range of 0.1 to 15 parts by mass, more preferably in a range of 0.5 to 10 parts by mass. A plurality of initiators may be used in combination.

EXAMPLES

The present invention will be described with reference to the following Examples; however, the present invention should not be limited thereto.

Measurement devices used in Examples are as follows.
[$^1$H-NMR]
 Model: JNM-ECX 300 manufactured by JEOL Ltd.
 Solvent for measurement: $CDCl_3$
 Reference substance: tetramethylsilane (0.0 ppm)
[GPC]
 Equipment: HLC-8320 GPC manufactured by TOSOH CORPORATION
 Column: Shodex KF-802.5L+KF-803L
 Column temperature: 40° C.
 Solvent: Tetrahydrofuran
 Detector: UV (254 nm)
 Calibration curve: standard polystyrene
[Rotational Viscometer]
 Equipment: VAR-50 manufactured by REOLOGICA Instruments
 Tool: Pararrel plate
[Thermogravimetry]
 Equipment: TG-DTA2010SA manufactured by Bruker AXS K.K.
[Refractive Index Measuring Apparatus]
 Equipment: MODEL2010 Prism Coupler manufactured by Metricon Corporation
[Thermo Machinal Analyzer]
 Equipment: TMA Q400EM manufactured by TA Instruments
[Haze Meter]
 Equipment: NDH5000 manufactured by NIPPON DENSHOKU INDUSTRIES CO., LTD.
[Interference Film Thickness Meter]
 Equipment: F20 manufactured by Filmetrics Japan, Inc.

Synthesis Example 1

<Synthesis of Reactive Silicone Compound 1>
A 1000 ml eggplant-shaped flask was charged with 0.80 mol (177 g) of diphenylsilanediol (manufactured by TOKYO CHEMICAL INDUSTRY CO., LTD), 0.80 mol (179 g) of styryltrimethoxysilane (manufactured by Shin-Etsu Chemical Co., Ltd.) and toluene (141 g) as a solvent. A condenser was attached to the eggplant flask, the inside of the flask was made to be nitrogen atmosphere by using a nitrogen balloon, and then a temperature of the mixture was gradually increased in an oil bath from the room temperature to 50° C. After the temperature of the mixture was confirmed to be stable at 50° C., 0.0016 mol (0.303 g) of barium hydroxide monohydrate (manufactured by Aldrich) was added to the flask as a catalyst, and the mixture was subjected to dealcoholization condensation for two days while the temperature was maintained at 50° C. The mixture was cooled to the room temperature and was filtered through a membrane filter having a pore diameter of 0.2 μm. Once again, the temperature of the mixture was increased to 50° C., and by using a rotary evaporator, toluene and methanol produced as a by-product were removed under vacuum. Finally, the pressure was returned to a normal pressure and removal of toluene was finished. Thus, a colorless and transparent reactive silicone compound 1 (105 g) was synthesized.

Figure 1:
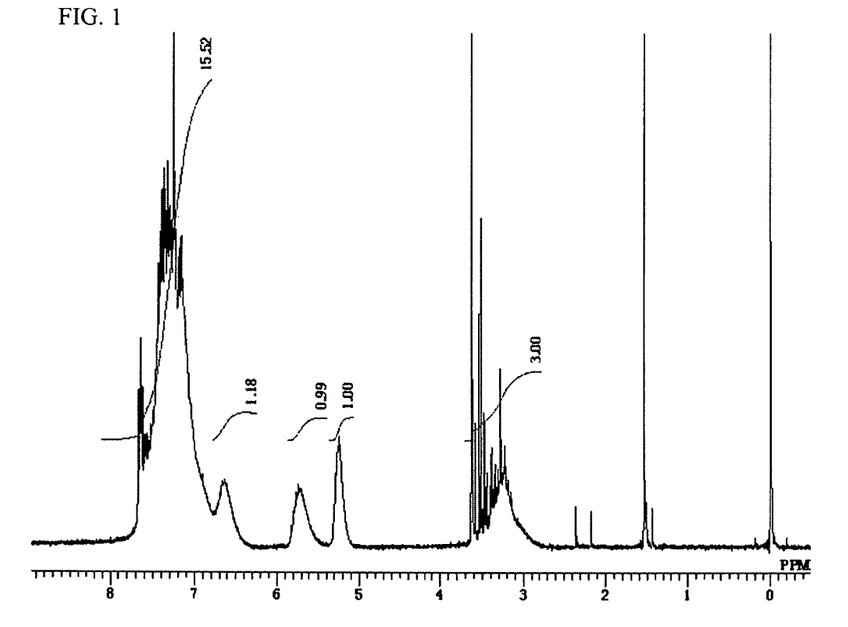
FIG. 1 is a $^1$H-NMR spectrum of the reactive silicone compound 1 prepared in Synthesis Example 1.

Measurement results of the reactive silicone compound 1 with $^1$H-NMR Spectrum are shown in FIG. 1. GPC shows that the weight-average molecular weight Mw in terms of polystyrene was 1550 and the degree of distribution Mw/Mn was 1.31.

Synthesis Example 2

Figure 2:
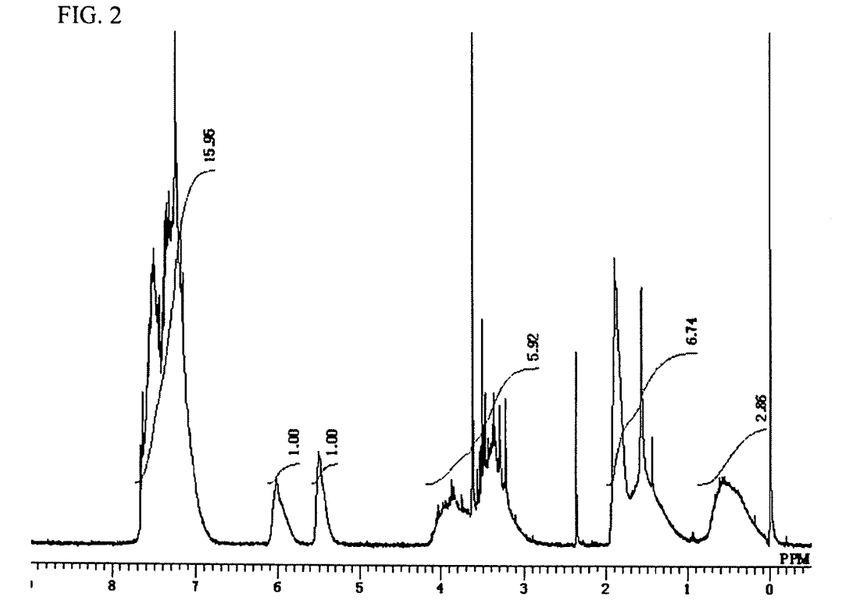
FIG. 2 is a $^1$H-NMR spectrum of the reactive silicone compound 2 prepared in Synthesis Example 2.

<Synthesis of Reactive Silicone Compound 2>
A 200 ml eggplant-shaped flask was charged with 0.10 mol (21.6 g) of diphenylsilanediol (manufactured by TOKYO CHEMICAL INDUSTRY CO., LTD), 0.10 mol (24.8 g) of 3-methacryloxypropyltrimethoxysilane (manufactured by Shin-Etsu Chemical Co., Ltd.) and toluene (19.2 g) as a solvent. A condenser was attached to the eggplant flask, the inside of the flask was made to be nitrogen atmosphere by using a nitrogen balloon, and then a temperature of the mixture was gradually increased in an oil bath from the room temperature to 50° C. After the temperature of the mixture was confirmed to be stable at 50° C., 0.0002 mol (0.038 g) of barium hydroxide monohydrate (manufactured by Aldrich) was added to the flask as a catalyst and the mixture was subjected to dealcoholization condensation for two days while the temperature was maintained at 50° C. The mixture was cooled to the room temperature and was filtered through a membrane filter having a pore diameter of 0.2 μm. Once again, the temperature of the mixture was increased to 50° C., and then by using a rotary evaporator, toluene and methanol produced as a by-product were removed under vacuum. Finally, the pressure was returned to a normal pressure and removal of toluene was finished. Thus, a colorless and transparent reactive silicone compound 2 (36 g) was synthesized. Measurement results of the reactive silicone compound 2 with $^1$H-NMR Spectrum are shown in FIG. 2. GPC shows that the weight-average molecular weight Mw in terms of polystyrene was 2760 and the degree of distribution Mw/Mn was 1.76.

Example 1

A 500 ml eggplant-shaped flask was charged with the reactive silicone compound 1 (100 g) obtained in Synthesis Example 1 and divinylbenzene (20 g) that was purified by distilling divinylbenzene (purity: 80%, manufactured by Nippon Steel Chemical Co., Ltd.) under reduced pressure in a range of 50° C. to 52° C. in 3 Torr ($3.99966 \times 10^2$ Pa). The temperature of the mixture was increased to 40° C. in an oil bath. While the temperature was maintained at 40° C., the mixture was stirred to be a homogeneous liquid. Finally, the temperature was returned to the room temperature, and thus, a pale yellow transparent polymerizable composition was obtained.

In 100 parts by mass of the polymerizable composition thus obtained, 3 parts by mass of Lucirin TPO (2,4,6-trimethylbenzoyl diphenylphosphine oxide) manufactured by BASF was dissolved as a photopolymerization initiator with stirring to prepare a photosensitive resin composition.

The photosensitive resin composition was held between two PET films holding a spacer of 500 μm thick therebetween, and was irradiated with 6 J/cm$^2$ of ultraviolet light radiated from a high-pressure mercury lamp in a state in which contact with air was avoided, to obtain a cured product.

Example 2

A photosensitive resin composition was prepared to obtain a cured product in the same manner as in Example 1, except that ethylene glycol dimethacrylate (20 g) (manufactured by TOKYO CHEMICAL INDUSTRY CO., LTD.) was used in place of divinylbenzene in Example 1.

Example 3

A photosensitive resin composition was prepared to obtain a cured product in the same manner as in Example 1, except that benzyl methacrylate (20 g) (manufactured by Aldrich) was used in place of divinylbenzene in Example 1.

Example 4

A photosensitive resin composition was prepared to obtain a cured product in the same manner as in Example 1, except that divinylbenzene (7 g) that was purified in the same manner as in Example 1 was used in place of divinylbenzene (20 g) in Example 1.

Example 5

A photosensitive resin composition was prepared to obtain a cured product in the same manner as in Example 1, except that divinylbenzene (40 g) that was purified in the same manner as in Example 1 was used in place of divinylbenzene (20 g) in Example 1.

Example 6

A photosensitive resin composition was prepared to obtain a cured product in the same manner as in Example 1, except that divinylbenzene (60 g) that was purified in the same manner as in Example 1 was used in place of divinylbenzene (20 g) in Example 1.

Comparative Examples

Comparative Example 1

In 100 parts by mass of the reactive silicone compound 1 obtained in Synthesis Example 1, 3 parts by mass of Lucirin TPO (2,4,6-trimethylbenzoyl diphenylphosphine oxide) manufactured by BASF was dissolved as a photopolymerization initiator with stirring to prepare a photosensitive resin composition.

The photosensitive resin composition was held between two PET films holding a spacer of 500 μm thick therebetween, and was irradiated with 6 J/cm$^2$ of ultraviolet light radiated from a high-pressure mercury lamp in a state in which contact with air was avoided, to obtain a cured product.

That is, the whole process was carried out in the same manner as in Example 1, except that divinylbenzene used in Example 1 was not used and the reactive silicone compound 1 was used as it was.

Comparative Example 2

In 100 parts by mass of the reactive silicone compound 2 obtained in Synthesis Example 2, 3 parts by mass of Lucirin TPO (2,4,6-trimethylbenzoyl diphenylphosphine oxide) manufactured by BASF was dissolved as a photopolymerization initiator with stirring to prepare a photosensitive resin composition.

The photosensitive resin composition was held between two PET films holding a spacer of 500 μm thick therebetween, and was irradiated with 6 J/cm$^2$ of ultraviolet light radiated from a high-pressure mercury lamp in a state in which contact with air was avoided, to obtain a cured product.

Comparative Example 3

A 500 ml eggplant-shaped flask was charged with the reactive silicone compound 2 (100 g) obtained in Comparative Example 2 and ethylene glycol dimethacrylate (20 g) (manufactured by TOKYO CHEMICAL INDUSTRY CO., LTD.). The temperature of the mixture was increased to 40° C. in an oil bath, while the temperature was maintained at 40° C., the mixture was stirred to be a homogeneous liquid. Finally, the temperature was returned to the room temperature, and thus, a pale yellow transparent polymerizable composition was synthesized.

In 100 parts by mass of the polymerizable composition thus obtained, 3 parts by mass of Lucirin TPO (2,4,6-trimethylbenzoyl diphenylphosphine oxide) manufactured by BASF was dissolved as a photopolymerization initiator with stirring to prepare a photosensitive resin composition.

The photosensitive resin composition was held between two PET films holding a spacer of 500 μm thick therebetween, and was irradiated with 6 J/cm$^2$ of ultraviolet light radiated from a high-pressure mercury lamp in a state in which contact with air was avoided, to obtain a cured product.

<Viscosity of Photosensitive Resin Composition>

The viscosity at 20° C. of each of the photosensitive resin compositions prepared above was measured with a rotational viscometer (VAR-50 manufactured by REOLOGICA Instruments).

<5% Weight Reduction Temperature of Photo Cured Product>

Approximately 5 mg of the photo cured product obtained were measured out, and with a thermogravimetry (TG-DTA2010SA, manufactured by Bruker AXS K.K.), a temperature at which the weight was reduced by 5% (5% weight reduction temperature) while the temperature was raised at a speed of 10° C./minute in the atmosphere, was measured. The results are shown in Table 1 and Table 2.

TABLE 1

| Examples and Comparative Examples | Reactive silicone compound (100 g) | Reactive diluent (20 g) | Viscosity of photosensitive resin composition (20° C.)[mPa · s] | 5% Weight reduction temperature of photo cured product [° C.] |
|---|---|---|---|---|
| Example 1 | Silicone compound 1 | Divinylbenzene (purity: 80%) | 420 | 403 |
| Example 2 | Silicone compound 1 | Ethylene glycol dimethacrylate | 1,320 | 362 |
| Example 3 | Silicone compound 1 | Benzyl methacrylate | 760 | 317 |
| Comparative Example 1 | Silicone compound 1 | None | 270,000 | 347 |
| Comparative Example 2 | Silicone compound 2 | None | 34,000 | 342 |
| Comparative Example 3 | Silicone compound 2 | Ethylene glycol dimethacrylate | 1,250 | 304 |

TABLE 2

| Examples | Amount to be added of divinylbenzene (purity: 80%) in terms of reactive silicone compound 1(100 g) | Viscosity of photosensitive resin composition (20° C.)[mPa · s] | 5% Weight reduction temperature of photo cured product [° C.] |
|---|---|---|---|
| Example 4 | 7g | 9000 | 407 |
| Example 1 | 20g | 420 | 403 |
| Example 5 | 40g | 60 | 403 |
| Example 6 | 60g | 20 | 357 |

<Evaluation of Transparency>

The photosensitive resin composition synthesized in Example 4 was applied by spin coating on a silicon substrate having a thermally oxidized film (in film thickness of 2 μm). Subsequently, with Mask Aligners (MA-6, manufactured by Suss MicroTec), pattern exposure was carried out to dissolve an unexposed part thereof in an organic solvent to remove it, and then a line-shape cured product having about 40 μm in width, about 30 μm in height and about 7 cm in length, was obtained. While this cured product was used as a core for an optical waveguide, the silicon thermally oxidized film as a lower clad layer, and air as a top and side clad layers, the propagation loss of the cured product was measured by using a cut-back method. White light from a halogen lamp was used as a light source, and the light exiting from the optical waveguide was separated by a spectrum analyzer to calculate the propagation loss in terms of a target wavelength. The measurement was carried out for a plurality of optical waveguides and the average values are shown in Table 3.

TABLE 3

| Measured wavelength | Transparency [dB/cm] |
|---|---|
| 850 nm | 0.09 |
| 1050 nm | 0.12 |
| 1060 nm | 0.10 |
| 1310 nm | 0.28 |
| 1550 nm | 0.44 |

Example 7

<Silica Sol Dispersion Photosensitive Resin Liquid>

A 500 ml eggplant-shaped flask was charged with the reactive silicone compound 1 (100 g) obtained in Synthesis Example 1 and divinylbenzene (7 g) that was purified by distilling divinylbenzene (purity: 80%, manufactured by Nippon Steel Chemical Co., Ltd.) under reduced pressure in a range of 50° C. to 52° C. in 3 Torr (3.99966×10$^2$ Pa). The temperature of the mixture was increased to 40° C. in an oil bath. While the temperature was maintained at 40° C., the mixture was stirred to be a homogeneous liquid. Finally, the temperature was returned to the room temperature, and thus, a pale yellow transparent polymerizable composition was obtained.

In 100 parts by mass of the polymerizable composition, 3 parts by mass of Lucirin TPO (2,4,6-trimethylbenzoyl diphenylphosphine oxide) manufactured by BASF was dissolved as a photopolymerization initiator with stirring to prepare a photosensitive resin composition.

To the photosensitive resin composition (100 g), a toluene dispersion liquid 144 g (solid content of 51.0 wt. %, particle diameter: 12 nm) of a silica sol with a surface modified by a vinylphenyl group, which is prepared by known method (for example, the method described in description of EP1544257B1), was added and the mixture was stirred at the room temperature to be a homogeneous liquid. Thus, a pale yellow transparent silica sol dispersion photosensitive resin liquid was obtained.

Example 8

<Zirconia Sol Dispersion Photosensitive Resin Liquid>

A 500 ml eggplant-shaped flask was charged with the reactive silicone compound 1 (100 g) obtained in Synthesis Example 1 and divinylbenzene (7 g) that was purified by distilling divinylbenzene (purity: 80%, manufactured by Nippon Steel Chemical Co., Ltd) under reduced pressure in a range of 50° C. to 52° C. in 3 Torr (3.99966×10$^2$ Pa). The temperature of the mixture was increased to 40° C. in an oil bath. While the temperature was maintained at 40° C., the mixture was stirred to be a homogeneous liquid. Finally, the temperature was returned to the room temperature, and thus, a pale yellow transparent polymerizable composition was obtained.

In 100 parts by mass of the polymerizable composition thus obtained, 3 parts by mass of Lucirin TPO (2,4,6-trimethylbenzoyl diphenylphosphine oxide) manufactured by BASF was dissolved as a photopolymerization initiator with stirring to prepare a photosensitive resin composition.

To the photosensitive resin composition (100 g), a methyl ethyl ketone (MEK) dispersion liquid 322 g (solid content of 34.6 wt. %, particle diameter: 13 nm) of zirconia sol with a surface modified by a vinylphenyl group, which prepared by known method (for example, the method described in description of EP1544257B1), was added and the mixture was stirred at the room temperature to be a homogeneous liquid. Thus, a pale yellow transparent zirconia sol dispersion photosensitive resin liquid was obtained.

<Evaluation of Refractive Index of Photo Cured Product with Dispersion of Inorganic Fine Particles>

The silica sol dispersion photosensitive resin liquid or zirconia sol dispersion photosensitive resin liquid prepared in Example 7 or Example 8 was applied by a casting method on a glass substrate that adhesive tape having a thickness of 50 μm was applied as a spacer at both ends, and was heated on a hot plate at 100° C. for 30 minutes to remove the solvent, and thus a coating film was produced. Subsequently, the resultant coating film was covered with a slide-glass and irradiated with 1.2 J/cm$^2$ of ultraviolet light radiated from a high-pressure mercury lamp, to be cured. The slide-glass was removed to obtain a photo cured product that one surface was exposed.

A refractive index of the photo cured product was measured by using Prism Coupler (MODEL2010, manufactured by Metricon Corporation). The measurement was carried out two times and the average value was calculated. The result is shown in Table 4.

In the meantime, a cured product was prepared similarly to the above from the photosensitive resin composition obtained in Example 4, and the refractive index thereof was measured. The result is shown in Table 4 together.

<Evaluation of Coefficient of Linear Thermal Expansion of Photo Cured Product with Dispersion of Inorganic Fine Particles>

The silica sol dispersion photosensitive resin liquid prepared in Example 7 was applied on a glass substrate by a casting method, and was heated on a hot plate at 60° C. for 30 minutes and then in an oven at 130° C. for 30 minutes to remove the toluene solvent, and thus a coating film was produced. Subsequently, the resultant coating film was irradiated with 1.2 J/cm$^2$ of ultraviolet light radiated from a high-pressure mercury lamp under nitrogen gas atmosphere, to be cured and obtain a photo cured product.

The coefficient of linear thermal expansion of the photo cured product was measured in a range of 50° C. to 100° C. by using (TMA Q400EM, manufactured by TA Instruments). The measurement was carried out three times and the average value was calculated. The results are shown in Table 4.

In the meantime, a cured product was prepared similarly to the above from the photosensitive resin composition obtained in Example 4, and the coefficient of linear thermal expansion thereof was measured. The result is shown in Table 4 together.

<Evaluation of Transparency of Photo Cured Product with Dispersion of Inorganic Fine Particles>

The silica sol dispersion photosensitive resin liquid prepared in Example 7 was applied on a glass substrate by a spin coating method, and was heated on a hot plate at 110° C. for 5 minutes to remove the toluene solvent, and thus a coating film was produced. Subsequently, the resultant coating film was irradiated with 1.2 J/cm$^2$ of ultraviolet light radiated from a high-pressure mercury lamp under nitrogen gas atmosphere, to be cured and obtain a photo cured product.

The transparency of the photo cured product was measured by using a haze meter (NDH 5000, manufactured by NIPPON DENSHOKU INDUSTRIES CO., LTD.). The results are shown in Table 4.

In the meantime, a cured product was prepared similarly to the above from the photosensitive resin composition obtained in Example 4, and the transparency thereof was measured. The result is shown in Table 4 together.

<Evaluation of Cure Shrinkage of Photo Cured Product with Dispersion of Inorganic Fine Particles>

The silica sol dispersion photosensitive resin liquid prepared in Example 7 was applied on a silicon wafer by a spin coating method, and was heated on a hot plate at 110° C. for 5 minutes to remove the toluene solvent, and thus a coating film was produced. Subsequently, the resultant coating film was irradiated with 1.2 J/cm$^2$ of ultraviolet light radiated from a high-pressure mercury lamp under nitrogen gas atmosphere, to be cured and obtain a photo cured product.

The cure shrinkage of the photo cured product was calculated by measuring a difference in film thickness between before and after curing. The measurement of the film thickness was carried out by using an interference film thickness meter (F20, manufactured by Filmnetrics Japan, Inc.). The results are shown in Table 4.

In the meantime, a cured product was prepared similarly to the above from the photosensitive resin composition obtained in Example 4, and the cure schrinkage thereof was measured. The result is shown in Table 4 together.

TABLE 4

| Examples | Type and amount to be added of Inorganic fine particles | Refractive index of photo cured product (wavelength 633 nm) | Coefficient of linear thermal expansion of photo cured product [ppm/k] | Haze of photo cured product | Cure shrinkage of photo cured product [%] |
|---|---|---|---|---|---|
| Example 4 | None | 1.60 | 147 | <0.1 | 1.53 |
| Example 7 | Toluene dispersed silica sol (solid part 74 g) | 1.55 | 106 | <0.1 | 1.16 |
| Example 8 | MEK dispersed zirconia sol (solid part 111 g) | 1.64 | Not measured | Not measured | Not measured |

[Evaluation Results]

As shown in Table 1, the photosensitive resin compositions prepared in Example 1, Example 2, and Example 3 had proper viscosities that were easier to work with, and exhibited high heat resistance at 300° C. or more. On the other hand, in Comparative Example 1 and Comparative Example 2, where the silicone compounds were used as they were, excellent heat resistance were obtained, but the viscosities of the photosensitive resin compositions were too high, resulting in inferior workability and unsuitable for practical use. As shown in Comparative Example 3, the addition of a reactive diluent significantly deteriorates the heat resistance of silicone compound 2. Accordingly, it can be seen that the silicone compound according to the present invention specifically obtains the effects, as exhibited by the silicone compound 1, of rarely causing deterioration of the heat resistance, or significantly improving it, even when a reactive diluent having a specific structure shown in the present invention is added.

As shown in Table 2, it can be seen that in the polymerizable composition according to the present invention, the viscosity of the photosensitive resin composition can be adjusted in a wide range by changing a mixing ratio of the silicone compound to the reactive diluent, while high heat resistance is maintained.

Table 3 shows transparency of the cured product of the polymerizable composition according to the present invention, and it can be seen that the transparency is high enough to endure practical use in an optical range in near-infrared wavelength from 850 nm to 1550 nm, where use of optical interconnect has been discussed.

From Table 4, it can be seen that the refractive index can be adjusted in a wide range of 1.55 to 1.64 by adding inorganic fine particles, and furthermore, the coefficient of linear thermal expansion and the cure shrinkage can be significantly reduced. High transparency was maintained with or without addition of inorganic fine particles, while any of the cured film showed lowered haze.

INDUSTRIAL APPLICABILITY

According to the present invention, it is possible to provide a polymerizable composition that has a proper viscosity to provide good workability, and to manufacture a cured product that is excellent in transparency in an optical range in near-infrared wavelength and has high heat resistance. Such a polymerizable composition is useful as an adhesive for optical components that are used in optical communications, or material for optical waveguide. Particularly, it is useful for application to a photoelectrical composite substrate and the like, where high-heat resistance is required.

The invention claimed is:

1. A polymerizable composition comprising:
(a) a reactive silicone compound obtained by polycondensing a diaryl silicic acid compound of Formula [1] below with a silane compound, selected under compounds of Formula [2] and Formula [2b] below in the presence of an acid or a base;

[1]

[2]

[2b]

wherein $Ar^1$ and $Ar^2$ are independently a phenyl group optionally substituted with a $C_1$-$C_6$ alkyl group, and X is a group which can undergo a hydrolytic condensation reaction, and wherein $Ar^3$ is naphthyl or anthracyl substituted with at least one group having a polymerizable double bond, or wherein $Ar^3$ is phenyl substituted with at least one group having a polymerizable double bond other than vinyl, or is phenyl substituted with at least two groups having a polymerizable double bond, and (b) a compound having at least one polymerizable alkenyl group of Formula [3], $$L\!\!-\!\!\left[Ar^4\!\!-\!\!\left(\!\!\begin{array}{c}R^1\\ \diagup\\ \diagdown\end{array}\!\!\right)_{\!\!n}\right]_{\!\!m}$$
(3)

wherein $R^1$ is a hydrogen atom or methyl group, L is a hydrogen atom, a $C_{1-20}$ aliphatic hydrocarbon residue having m-valence that is optionally substituted with a phenyl group, a $C_{1-20}$ aliphatic hydrocarbon residue having m-valence that optionally contains an ether bond, or a $C_{1-20}$ polyvalent alcohol residue optionally containing an ether bond, $Ar^4$ is a monocyclic or bicyclic or tricyclic, in each case aromatic hydrocarbon residue with n+1 valences, m is 1 and n is 2; or wherein $R^1$ is a hydrogen atom or methyl group, L is a single bond, an oxygen atom, a $C_{1-20}$ aliphatic hydrocarbon residue having m-valence that is optionally substituted with a phenyl group, a $C_{1-20}$ aliphatic hydrocarbon residue having m-valence that optionally contains an ether bond, or a $C_{1-20}$ polyvalent alcohol residue optionally containing an ether bond, $Ar^4$ is a monocyclic or bicyclic or tricyclic, in each case aromatic hydrocarbon residue with n+1 valences, m is 2 or 3 and each of n is independently 1 or 2;

with the proviso that when L is a single bond or an oxygen atom, m is 2.

2. The composition according to claim 1, wherein X is an alkoxy group having 1 to 10 carbon atoms.

3. The composition according to claim 2, wherein X is methoxy or ethoxy.

4. The composition of claim 1, wherein $Ar^4$ is a phenyl residue.

5. The composition according to claim 4, wherein in the formula [3], n is 2.

6. The composition according to claim 1, wherein in the formula [3], L is a hydrogen atom, m is 1, and n is 2.

7. The composition according to claim 1, further comprising inorganic fine particles.

8. The composition according to claim 1, further comprising a solvent.

9. The composition according to claim 1, further comprising a polymerization initiator.

10. A cured product obtained by reacting a polymerizable double bond in the reactive silicone compound with a polymerizable group in the compound having at least one polymerizable group, in the composition according to claim 1.

11. Use of a material comprising a composition according to claim 1, for the preparation of components of optical devices, such as optical adhesives, transparent sealers, or cores or claddings of optical signal transmission devices, wherein said preparation includes curing the composition by reacting a polymerizable double bond in the reactive silicone compound with a polymerizable group in the compound having at least one polymerizable group, in the presence of a photo-radical initiator or a thermal radical initiator by light irradiation or heating.

12. Use of a material according to claim 1, for the preparation of optical interconnections of printed wiring boards wherein the optical interconnection is preferably a chip-to-chip optical interconnection, wherein said preparation includes curing the composition by reacting a polymerizable double bond in the reactive silicone compound with a polymerizable group in the compound having at least one polymerizable group, in the presence of a photo-radical initiator or a thermal radical initiator by light irradiation or heating.

13. A cured product as claimed in claim 10 which is a component of optical devices, preferably an optical adhesive, transparent sealer, or core or cladding of optical signal transmission devices.

14. A cured product as claimed in claim 10 which is a component of an optical interconnection of printed wiring boards wherein the optical interconnection is preferably a chip-to-chip optical interconnection.

* * * * *

UNITED STATES PATENT AND TRADEMARK OFFICE
CERTIFICATE OF CORRECTION

PATENT NO. : 9,434,818 B2
APPLICATION NO. : 13/980501
DATED : September 6, 2016
INVENTOR(S) : Michael Popall et al.

Page 1 of 2

It is certified that error appears in the above-identified patent and that said Letters Patent is hereby corrected as shown below:

On the Title Page

At (73): Please delete ..."Fraundhofer-Gesellschaft zur Foerderung der angewandter"... and insert ...--Fraunhofer-Gesellschaft zur Foerderung der angewandten--...

In the Specification

At Column 7, Line 50: Please delete ..."Formula or [2b]"... and insert ...--Formula [2] or [2b]--...

At Column 9, Line 62: Please delete ..."(—$CH_2CH_2OCH_2CH_2$—)"... and insert ...--(-$CH_2CH_2OCH_2CH_2$-)--...

At Column 9, Line 63: Please delete ..."(—($CH_2CH_2O)_2CH_2$—$CH_2$—)"... and insert ...--(-($CH_2CH_2O)_2CH_2CH_2$-)--...

At Column 9, Lines 64-65: Please delete ..."(—$CH_2CH_2CH_2OCH_2CH_2CH_2$—)"... and insert ...--(-$CH_2CH_2CH_2OCH_2CH_2CH_2$-)--...

At Column 9, Line 65: Please delete ..."(—$C(-)_2CH_2CH_3$)"... and insert ...--(-$C(-)_2CH_2CH_3$)--...

At Column 9, Line 66: Please delete ..."(—$CH(-)CH_2CH_2$—)"... and insert ...--(-$CH(-)CH_2CH_2$-)--...

At Column 10, Line 34: Please delete ..."(—$CH_2CH_2OCH_2CH_2$—)"... and insert ...--(-$CH_2CH_2OCH_2CH_2$-)--...

At Column 10, Line 35: Please delete ..."(—$CH_2CH_2O)_2CH_2CH_2$—)"... and insert ...--(-$CH_2CH_2O)_2CH_2CH_2$-)--...

Signed and Sealed this
Twentieth Day of February, 2018

Andrei Iancu
*Director of the United States Patent and Trademark Office*

CERTIFICATE OF CORRECTION (continued)
U.S. Pat. No. 9,434,818 B2

At Column 10, Line 36: Please delete ..."(—($CH_2CH_2CH_2OCH_2CH_2CH_2$—)"... and insert ...--(-$CH_2CH_2CH_2OCH_2CH_2CH_2$-)--...

At Column 10, Line 37: Please delete ..."(—$C(-)_2CH_2CH_3$)"... and insert ...--(-$C(-)_2CH_2CH_3$)--...

At Column 10, Line 37: Please delete ..."1,3,3"... and insert ...--1,1,3--...

At Column 10, Lines 37-38: Please delete ..."(—$CH(-)CH_2CH_2$—)"... and insert ...--(-$CH(-)CH_2CH_2$-)--...

At Column 10, Lines 39-40: Please delete ..."(—($CH_2CH(-)CH_2CH_2$—)"... and insert ...--(-$CH_2CH(-)CH_2CH_2$-)--...

At Column 10, Line 45: Please delete ..."of Formula [3] and/or can be used"... and insert ...--of Formula [3] and/or [4] can be used--...

At Column 11, Line 23: Please delete ..."preferably 5 to 5 0parts"... and insert ...--preferably 5 to 50 parts--...